(12) United States Patent
Park et al.

(10) Patent No.: US 8,049,618 B2
(45) Date of Patent: Nov. 1, 2011

(54) INDOOR LOCATION SYSTEM HAVING SENSOR AND METHOD FOR CHECKING LOCATION USING THE SAME

(75) Inventors: Sung Kweon Park, Suwon-si (KR); Won Suk Yang, Seoul (KR); Yun Je Oh, Seongnam-si (KR); Joon Oo Kim, Suwon-si (KR); Jeong Rok Park, Hwaseong-si (KR); Sang Mook Lee, Suwon-si (KR); Jin Serk Baik, Ansan-si (KR); Do Young Ha, Seongnam-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 402 days.

(21) Appl. No.: 12/267,775

(22) Filed: Nov. 10, 2008

(65) Prior Publication Data

US 2009/0121867 A1     May 14, 2009

(30) Foreign Application Priority Data

Nov. 13, 2007   (KR) .................. 10-2007-0115265

(51) Int. Cl.
*G08B 1/08*   (2006.01)
(52) U.S. Cl. ............ 340/539.32; 340/989; 340/991; 340/573.1; 340/539.13; 340/539.22
(58) Field of Classification Search .......... 340/989, 340/991, 573.1, 539.13, 539.22, 539.32
See application file for complete search history.

(56) References Cited

U.S. PATENT DOCUMENTS

| | | | | |
|---|---|---|---|---|
| 4,081,603 A * | 3/1978 | Davis et al. | ............ | 178/18.01 |
| 7,260,408 B2 * | 8/2007 | Friday et al. | ............ | 455/456.1 |
| 7,679,523 B2 * | 3/2010 | Leitch et al. | ............ | 340/825.49 |
| 7,738,456 B2 * | 6/2010 | Toebes et al. | ............ | 370/392 |
| 2005/0208952 A1 * | 9/2005 | Dietrich et al. | ............ | 455/456.1 |
| 2007/0096984 A1 * | 5/2007 | Leitch et al. | ............ | 342/453 |
| 2007/0139191 A1 * | 6/2007 | Quatro | ............ | 340/539.13 |

FOREIGN PATENT DOCUMENTS

KR   2005-018440   2/2005

* cited by examiner

*Primary Examiner* — Daryl Pope
(74) *Attorney, Agent, or Firm* — Cha & Reiter, LLC

(57) ABSTRACT

An indoor location system having a sensor and a method for checking an indoor location using the indoor location system are disclosed. The method includes: calculating a current location coordinate by using nodes; calculating a first movement distance by comparing the current location coordinate and a stored previous location coordinate; calculating a second movement distance through a sensor; and storing the current location coordinate instead of the previous location coordinate when the distance between the first movement distance and the second movement distance is smaller than a predetermined threshold value. Accordingly, an accurate location of an object can be recognized indoors and an error can be prevented from being caused when the location of the object is recognized.

12 Claims, 3 Drawing Sheets

INDOOR LOCATION SYSTEM HAVING SENSOR AND METHOD FOR CHECKING LOCATION USING THE SAME

CLAIMS OF PRIORITY

This application claims priority to an application entitled "INDOOR LOCATION SYSTEM HAVING SENSOR A-ND METHOD FOR CHECKING LOCATION USING THE SAME," filed in the Korean Intellectual Property Office on Nov. 13, 2007 and assigned Serial No. 2007-0115265, the entire contents of which are incorporated herein by reference.

BACKGROUND OF THE INVENTION

1. Field of the Invention

The present invention relates generally to an indoor location system and a method for checking a location using the indoor location system, and more particularly, to an indoor location system having a sensor and a method for checking an indoor location using the indoor location system.

2. Description of the Related Art

Due to development of technologies, the movement direction or location of a moving object can be determined by using a global positioning system (GPS). In addition, the movement direction or location of a moving object or person can be determined by using sensors.

Generally, the movement direction or location of an object or a person is determined through triangulation. According to the triangulation, the distances between an object or person and three GPS satellites or sensors are measured in order to determine the movement direction or location of the object or person by using the measured distances.

In particular, in a method for checking an indoor location through sensors using radio waves, etc., many errors regarding the time intervals in which these radio waves are transmitted and received may be caused by influences such as the peripheral environment. In other words, errors may be caused by obstacles or white noise that can make the time interval in which a radio wave returns longer or shorter.

SUMMARY OF THE INVENTION

The present invention provides an indoor location system having a sensor and a method for checking an indoor location using the indoor location system.

The present invention also provides an indoor location system and a method for checking a location by using a sensor and a node in the indoor location system.

In accordance with an embodiment of the present invention, a method for checking a location includes: calculating a current location coordinate by using nodes; calculating a first movement distance by comparing the current location coordinate and a stored previous location coordinate; calculating a second movement distance through a sensor; and storing the current location coordinate instead of the previous location coordinate when the distance between the first movement distance and the second movement distance is smaller than a threshold value.

In accordance with another embodiment of the present invention, an indoor location system includes: a node transmitting and receiving a radio wave; and a tag calculating a current location coordinate by receiving the radio wave from the node, calculating a movement distance by using the current location coordinate and a previous location coordinate, and discarding or storing the current location value through the calculated movement distance.

In an alternative embodiment of the present invention, an error caused by a peripheral environment, etc. may be reduced by comparing a movement distance checked by nodes and a movement distance measured through a sensor, when an indoor location is measured. Therefore, the accuracy of the measured indoor location can be enhanced.

BRIEF DESCRIPTION OF THE DRAWINGS

The features and advantages of the present invention will be more apparent from the following detailed description taken in conjunction with the accompanying drawings, in which.

DETAILED DESCRIPTION OF THE INVENTION

Hereinafter, embodiments of the present invention are described in detail with reference to the accompanying drawings. The same reference symbols are used throughout the drawings to refer to the same or like parts. For the purposes of clarity and simplicity, detailed descriptions of well-known functions and structures incorporated herein may be omitted to avoid obscuring the subject matter of the present invention.

A 'tag' refers to a transmitter attached to an object or a person the location of which is to be determined. The tag calculates the distance between a receiver and a transmitter by transmitting a radio wave to the receiver and measuring the time interval it takes the transmitted radio wave to return to the transmitter. The tag can determine the location of an object or a person by measuring the time intervals it takes a radio wave to return from each of at least three receivers thereof.

A 'node' refers to a receiver receiving a radio wave from a transmitter and transmitting the received radio wave again in order to determine a location of the transmitter. At least three nodes are necessary to determine the location of an object or a person.

An 'indoor location system' includes a tag, nodes, and a location checking system. The tag may be a card, an identification tag, a mobile terminal, and an RF tag and the node may be an RF tag, a base station of a mobile terminal, and a GPS system. The location checking system can read the location of an object or a person from a tag and display it by using a computer, etc.

A 'previous location coordinate' refers to a location coordinate stored to measure a movement distance of a tag and a location coordinate corresponding to a location before the tag is moved to a current location. In other words, the previous location coordinate refers to the most recently stored location coordinate of the tag.

Figure 1:
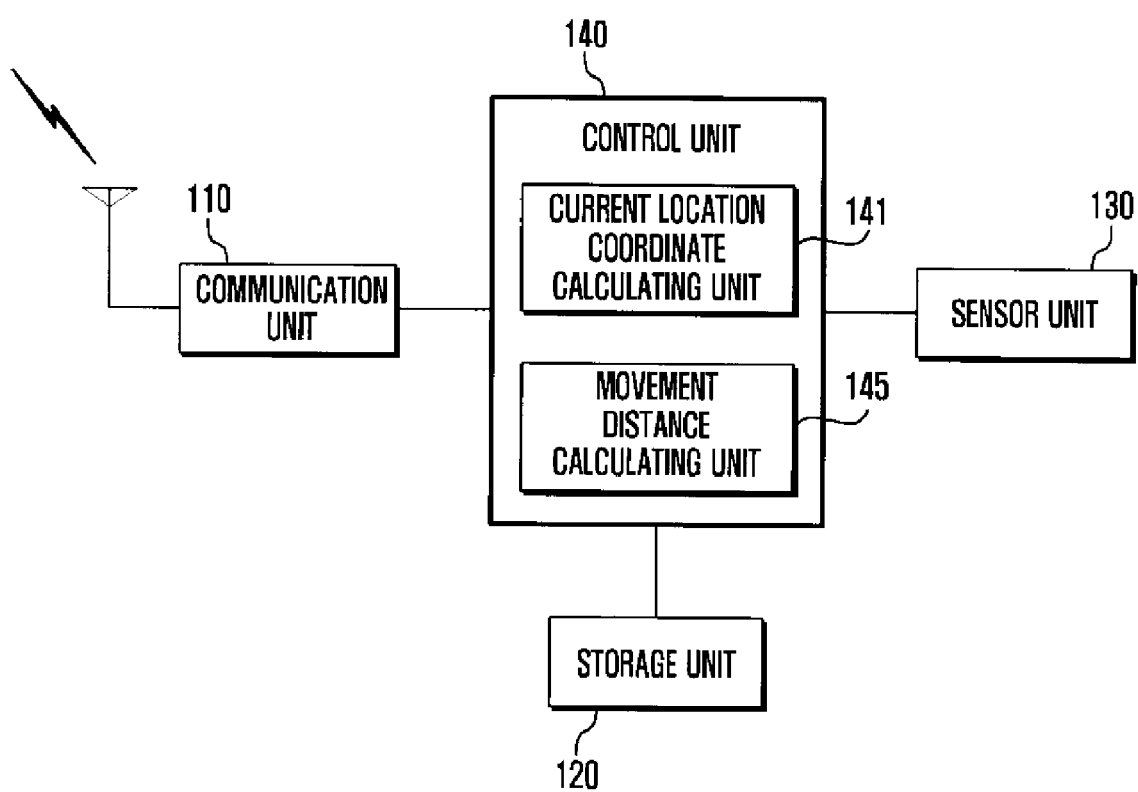
FIG. 1 is a block diagram illustrating a tag according to an embodiment of the present invention.

FIG. 1 is a block diagram illustrating a tag according to an embodiment of the present invention.

Referring to FIG. 1, the tag includes a communication unit 110, a storage unit 120, a sensor unit 130, and a control unit 140.

The communication unit 110 performs communication between the tag and a node. The communication unit 110 transmits a radio wave to the node and receives a radio wave sent by the node in response to receiving the radio wave transmitted by the communication unit 110.

The storage unit 120 stores a program controlling the operation of the tag and data produced during the operation of the tag. In particular, the storage unit 120 stores a current location coordinate calculated by using time points when a radio wave is transmitted and received between the tag and a node instead of a previous location coordinate.

The sensor unit 130 can check a gravitational acceleration that is changed when the tag is moved. In particular, the sensor unit 130 uses an acceleration sensor that can check a movement of the tag by checking the changes in acceleration parameters in the x-axis, y-axis, and z-axis directions.

The control unit 140 controls an overall state and operation of elements of the tag. In particular, the control unit 140 includes a current location coordinate calculating unit 141 and a movement distance calculating unit 145. The current location coordinate calculating unit 141 calculates an average time of arrival (hereinafter, referred to as 'TOA') by measuring time intervals in which it takes radio waves transmitted to three nodes by the communication unit 110 to be returned thereby. A location coordinate where the tag is currently located is calculated by using the calculated TOA values. Although it has been described that the current location coordinate is calculated by using the TOA values calculated using three nodes, the number of nodes for calculating the current location coordinate may be one or many, according to at least one of the type and environment of the indoor location system.

The movement distance calculating unit 145 calculates a first movement distance by comparing the current location coordinate where the tag is currently located and the stored previous location coordinate. The first movement distance is calculated by using Formula 1.

$$\text{First movement distance} = \sqrt{(x1-x2)^2 + (y1-y2)^2} \quad \text{Formula 1}$$

(where, (x1,y1) is the current location coordinate and (x2, y2) is the previous location coordinate.)

The control unit 140 compares the first movement distance calculated by Formula 1 and a first predetermined threshold value. The first predetermined threshold value refers to the maximum movement distance that can occur indoors, and can be set by one of a user and when the tag is manufactured. If the first movement distance is greater than the first predetermined threshold value, the control unit 140 compares the first movement distance and a second movement distance by calculating the second movement distance through the sensor unit 130. The second movement distance is calculated by using Formula 2.

$$\text{Second movement distance } 0.5 * a * t^2 \quad \text{Formula 2}$$

(where, 'a' is an acceleration value and 't' is a movement time interval)

When the comparison value between the first movement distance value and the second movement distance value is less than a second predetermined threshold value, the control unit 140 stores the current location coordinate in the storage unit 120 instead of the previous location coordinate. The second predetermined threshold value can be set by one of a user and according to one of the type and environment of the indoor location system.

In the above-mentioned tag, the control unit 140 can calculate a current location coordinate of the tag by transmitting and receiving a radio wave to and from a node by the communication unit 110 and checking the time interval between the time points when the radio wave is transmitted and received. The control unit 140 can calculate a first movement distance by comparing the calculated current location coordinate with a previous location coordinate stored in the storage unit 120 and then can determine whether the current location coordinate has been accurately calculated, by comparing the calculated first movement distance with a first predetermined threshold value. When the calculated first movement distance is greater than the first predetermined threshold value, the control unit 140 compares the first movement and a second movement distance by calculating the second movement distance through the sensor unit 130. The control unit 140 can store or discard the current location coordinate according to the comparison result.

Figure 2:
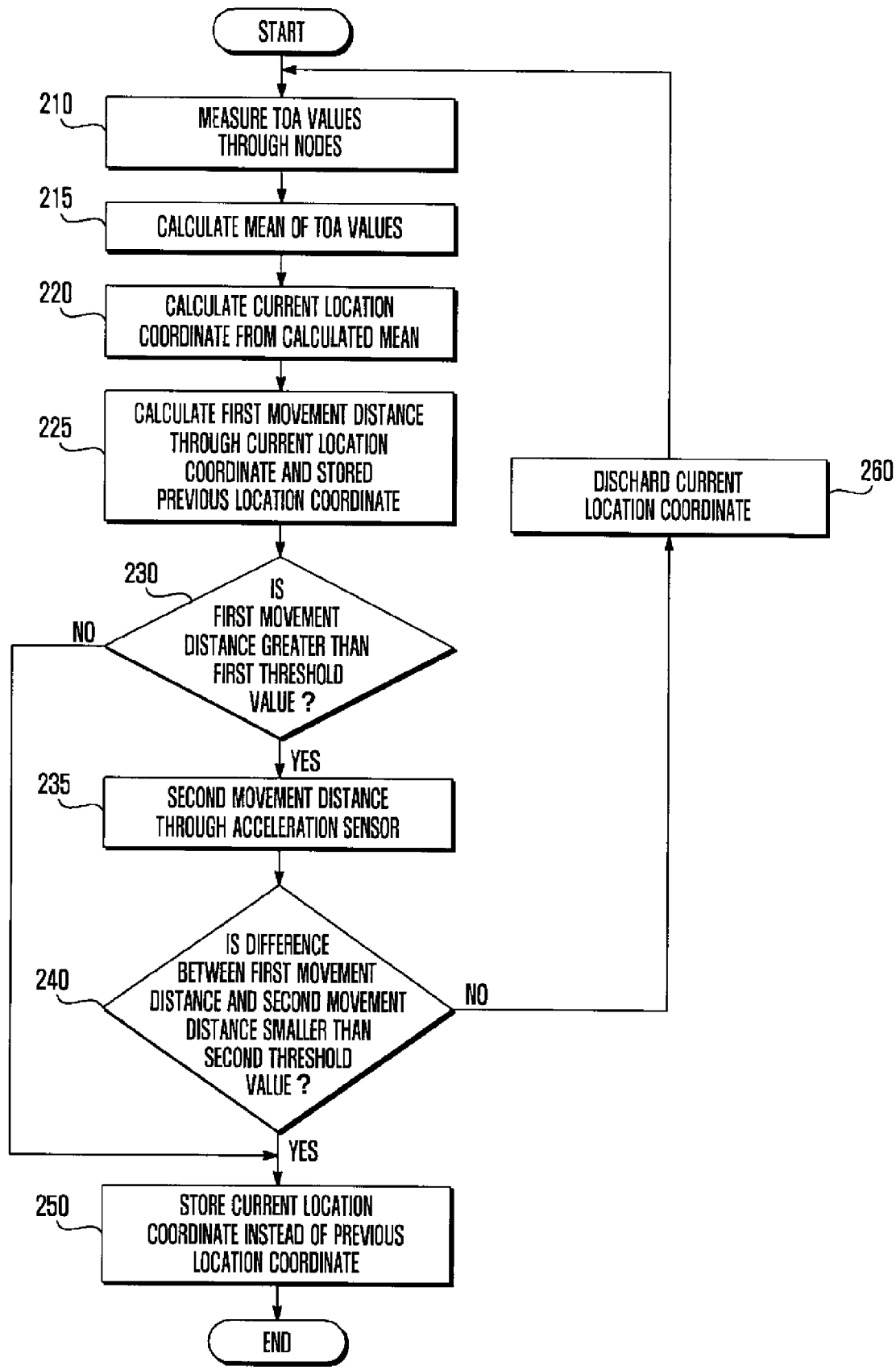
FIG. 2 is a flow chart illustrating a method for checking a location according to a first embodiment of the present invention.

FIG. 2 is a flow chart illustrating a method for checking a location according to an embodiment of the present invention.

Referring to FIG. 2, in the step 210, the control unit 140 transmits a radio wave to nodes and records TOA values that are the time intervals between the time points when the radio wave is transmitted and received for each node. In the step 215, the control unit 140 calculates the mean of the TOA values recorded for the nodes. In the step 220, the control unit 140 calculates a current location coordinate of a tag by using the mean of the TOA values that is calculated in the step 215. In an embodiment of the present invention, the control unit 140 transmits a radio wave to the nodes, determines time intervals between time points when the radio wave is transmitted and received for each node, and calculates a current location coordinate of the tag by using the determined time intervals. In the present embodiment of the current invention, the control unit 140 determines the movement distance through the calculated current location coordinate. If the movement distance exceeds a predetermined allowable value, the control unit 140 determines a movement distance through the acceleration sensor. Accordingly, the control unit 140 can store or discard the current location coordinate by comparing the movement distance calculated through the acceleration sensor and the current location value.

The control unit 140 calculates a first movement distance through the current location coordinate calculated in the step 225 and the previous location coordinate stored in the storage unit 120. The first movement distance is calculated by using Formula 1. Since Formula 1 has been described in detail in FIG. 1, a detailed description thereof will be omitted.

The control unit 140 determines whether the first movement distance calculated in the step 230 is greater than a first predetermined threshold value. For example, when the predetermined first threshold value is set to 3 meters, the control unit 140 determines whether the calculated first movement distance is greater than the first predetermined threshold value, i.e. 3 meters. The first predetermined threshold value refers to the maximum distance by which the tag can be moved when the coordinate of the tag is determined using the indoor location system of the present invention. The maximum distance by which the tag can be moved can be set differently accordingly to the size of a room in which the indoor location system is installed and can be set differently by a user.

If the calculated first movement distance is greater than the first predetermined threshold value, the control unit 140 calculates a second movement distance using the acceleration sensor, in the step 235. The second movement distance is calculated by measuring an acceleration 'a' by using the acceleration sensor and Formula 2 that employs the measured acceleration 'a'. Formula 2 has been described in detail in FIG. 1 and discussed above.

In the step 240, the control unit 140 determines whether the difference between the first movement distance and the second movement distance is smaller than a second predetermined threshold value. The second predetermined threshold value can be set by any of a user and according to environmental factors in the indoor location system. It can be seen that the smaller the difference between the first movement distance and the second movement distance, the closer the first movement distance calculated by using the current location value and the second movement distance calculated through the acceleration sensor, and the actual movement distance are. Accordingly, it is determined whether the first movement distance and the second movement distance are calculated without any difference from the actual movement distance by setting the second predetermined threshold value to a minimum value.

On the other hand, if the calculated first movement distance is not greater than the first predetermined threshold value, the control unit 140 stores the current location coordinate in the storage unit 120 in the step 250.

When the difference between the first movement distance and the second movement distance is smaller than the second predetermined threshold value, instead of the previous location coordinate the control unit 140 stores the current location coordinate calculated using the TOA values in the storage unit 120. Then, the previous location coordinate already stored in the storage unit 120 may be deleted under the control of the control unit 140. Meanwhile, the control unit 140 accumulates the previous location coordinates and tracks the changes in location of the tag through the accumulated previous location coordinates.

On the other hand, if the difference between the first movement distance and the second movement distance is greater than the second predetermined threshold value, the control unit 140 discards the current location coordinate calculated using the TOA values in the step 260 and returns to the step 210.

Figure 3:
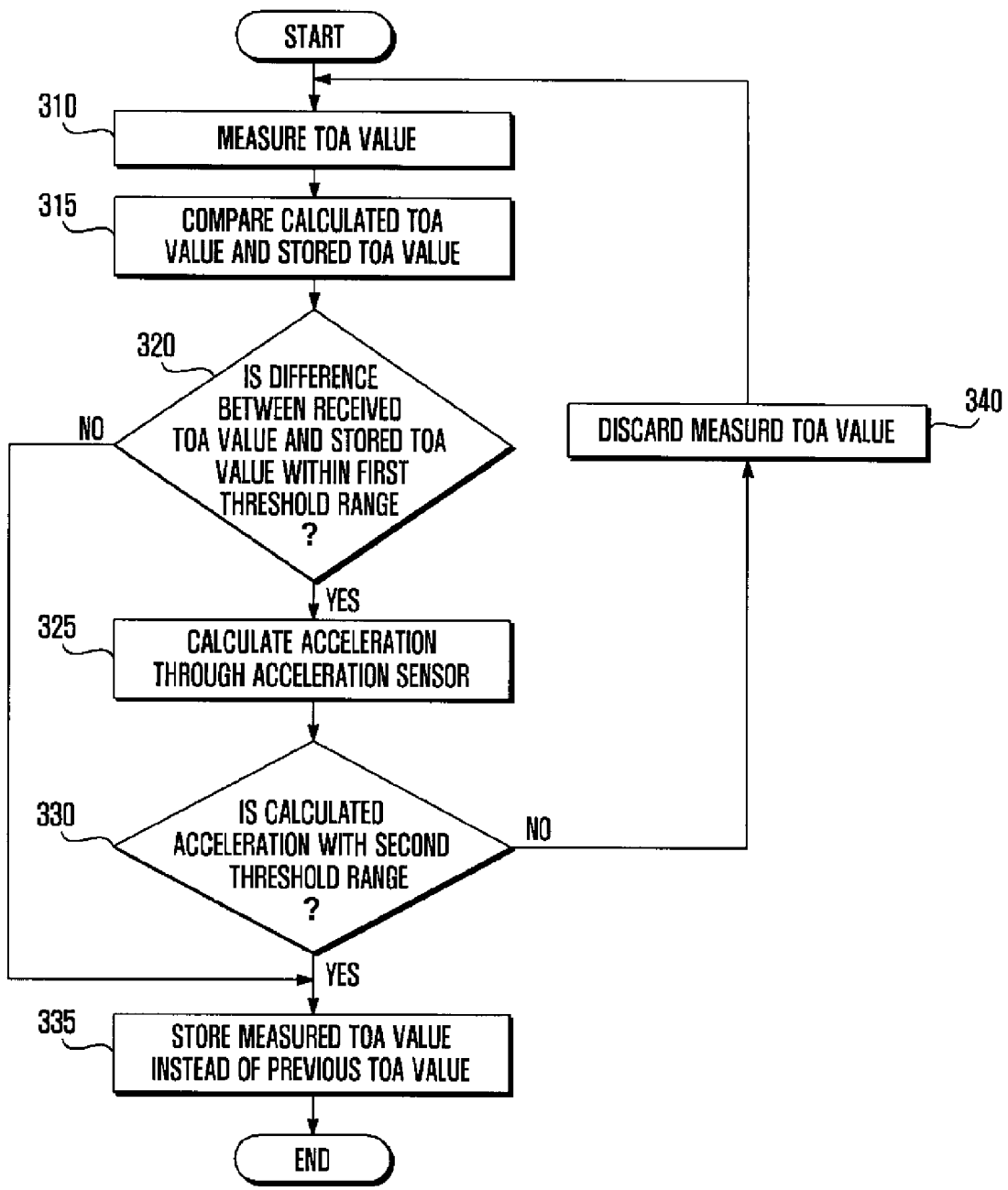
FIG. 3 is a flow chart illustrating a method for checking a location according to a second embodiment of the present invention.

FIG. 3 is a flow chart illustrating a method for determining a location, according to another embodiment of the present invention.

Referring to FIG. 3, the control unit 140 receives a radio wave returning from a node, and measures a TOA value in the step 310. In the step 315, the control unit 140 compares the calculated TOA value and a TOA value stored in the storage unit 120.

In the step 320, the control unit 140 determines whether the difference between the received TOA value and the stored TOA value is within a first predetermined threshold range. The first predetermined threshold range can be the minimum time interval and the maximum time interval for returning a radio wave from a node by assuming a minimum error that can be caused by environmental factors, such as obstacles to movement and white noise in the indoor location system.

If the received TOA value and the stored TOA value are not in the first predetermined threshold range, in the step 325, the control unit 140 calculates an acceleration 'a' using the sensor unit 130. If the acceleration 'a' is calculated, in the step 330, the control unit 140 determines whether the calculated acceleration 'a' is within a second predetermined threshold range. If the calculated acceleration 'a' is with the second predetermined threshold range, in the step 335, the control unit stores the measured TOA value in the storage unit 120. Then, the control unit 140 can calculate the current location coordinate of the tag by using the measured TOA value.

On the other hand, if the calculated acceleration 'a' is not within the second predetermined threshold range in the step 330, in the step 340, the control unit 140 discards the measured TOA value and returns to the step 310. For example, assuming that the first predetermined threshold range is 8 ns to 9 ns and the second predetermined threshold range is 1 g to 1.5 g, if the difference between the measured TOA value and the stored TOA value is greater than 10 ns and the calculated acceleration 'a' is smaller than 2 g, the control unit 140 determines that an error is generated through an obstacle, etc. when a radio wave is transmitted and received, discards the measured TOA value, and measures the TOA value again. If the difference between the measured TOA value and the stored TOA value is greater than 10 ns and the calculated acceleration 'a' is greater than 2 g, the control unit 140 determines that an error is generated through an obstacle, etc. when a radio wave is transmitted and received, discards the measured TOA value, and measures the TOA value again.

Although exemplary embodiments of the present invention have been described in detail hereinabove, it should be understood that many variations and modifications of the basic inventive concept herein described, which may occur to those skilled in the art, will still fall within the spirit and scope of the exemplary embodiments of the present invention as defined in the appended claims.

What is claimed is:

1. A method for checking a location, the method comprising:
    calculating a current location coordinate by using nodes;
    calculating a first movement distance by comparing the calculated current location coordinate and a stored previous location coordinate;
    calculating a second movement distance by use of a sensor; and
    storing the current location coordinate instead of the previous location coordinate when the distance between the first movement distance and the second movement distance is smaller than a first predetermined threshold value.

2. The method of claim 1, wherein calculating the current location coordinate further comprises:
    measuring time of arrival (TOA) values that are time intervals in which a radio wave returns from the nodes; and
    calculating the current location coordinate by use of the TOA values.

3. The method of claim 1, wherein calculating the second movement distance further comprises:
    determining whether the first movement distance is greater than a second predetermined threshold value; and
    calculating a second movement distance by use of the sensor when the first movement distance is greater than the second predetermined threshold value.

4. The method of claim 3, wherein calculating the second movement distance further comprises storing the current location coordinate instead of the previous location coordinate when the first movement distance is smaller than the second predetermined threshold value.

5. The method of claim 4, wherein, storing the previous location coordinate further comprises discarding the current location coordinate when the difference between the first movement distance and the second movement distance is greater than the first predetermined threshold value.

6. The method of claim 1, wherein the sensor is an acceleration sensor.

7. An indoor location system comprising:
    at least one node for transmission and reception of a radio wave; and
    a tag for calculation of a current location coordinate using the received radio wave from the node, calculation of a movement distance using the calculated current location coordinate and a previously calculated and stored location coordinate, and performance of one of discarding and storage of the calculated current location value using the calculated movement distance, wherein the tag comprises, a communication unit transmitting and receiving the radio wave to and from the nodes;

a control unit calculating a first movement distance by using the current location coordinate and a stored previous location coordinate, calculating a second movement distance by use of acceleration, and storing the current location coordinate according to the difference between the first movement distance and the second movement distance;

a storage unit storing the current location coordinate under the control of the control unit; and a sensor unit measuring the acceleration under the control of the control unit.

8. The indoor location system of claim 7, wherein the control unit calculates the current location coordinate by measuring a time of arrival (TOA) values that are time intervals between the time points when the radio wave is transmitted and received, and controls the storage unit to store the current location coordinate instead of the previous location coordinate if a difference between the first movement distance and the second movement distance is smaller than a predetermined threshold value.

9. The indoor location system of claim 8, wherein the control unit is further configured to discard the current location coordinate when the difference between the first movement distance and the second movement distance is greater than the predetermined threshold value.

10. A method for an indoor location system comprising:

measuring a time of arrival (TOA) value for a radio wave transmitted to a node as the time for return of the radio wave from the node;

comparing the measured TOA value and a stored previous TOA value;

determining whether the difference between the measured TOA value and the stored previous TOA value is within a first threshold range:

calculating an acceleration using a sensor when the difference between the measured TOA value and the stored previous TOA value is not within the first threshold range; and storing the measured TOA value in place of a previous TOA value when the calculated acceleration is within a threshold value.

11. The method of claim 10, further comprising: storing the measured TOA value in place of the stored previous TOA value when the difference between the measured TOA value and the stored previous TOA value is within the second predetermined threshold range.

12. The method, of claim 10, further comprising discarding the measured TOA value when the calculated acceleration is not within the second predetermined threshold range.

* * * * *